United States Patent
Guo (10) Patent No.: US 7,282,704 B2
(45) Date of Patent: Oct. 16, 2007

(54) METHOD FOR DETERMINING FORMATION POROSITY AND GAS SATURATION IN A GAS RESERVOIR

(75) Inventor: Pingjun Guo, Pearland, TX (US)

(73) Assignee: Baker Hughes Incorporated, Houston, TX (US)

(*) Notice: Subject to any disclaimer, the term of this patent is extended or adjusted under 35 U.S.C. 154(b) by 285 days.

(21) Appl. No.: 10/856,449

(22) Filed: May 28, 2004

(65) Prior Publication Data

US 2005/0263691 A1   Dec. 1, 2005

(51) Int. Cl.
   *G01V 5/08*   (2006.01)
(52) U.S. Cl. .............. 250/266; 250/253; 250/256; 250/265; 250/269.1; 250/269.2; 250/269.3; 250/269.4; 250/269.5; 250/269.6; 250/269.7; 250/269.8; 702/6; 702/13; 324/303; 324/338; 324/333; 324/339
(58) Field of Classification Search .......... 250/266, 250/253, 256, 265, 269.1, 269.2, 269.3, 269.4, 250/269.5, 269.6, 269.7, 269.8; 702/6, 13; 324/303, 338, 333, 339
   See application file for complete search history.

(56) References Cited

U.S. PATENT DOCUMENTS

| | | | |
|---|---|---|---|
| 3,566,117 A | 2/1971 | Tixier ..................... 250/83.1 |
| 4,416,151 A | 11/1983 | Ullo ........................ 73/152 |
| 4,617,825 A | 10/1986 | Ruhovets ................... 73/152 |
| 4,645,927 A | 2/1987 | Ellis .......................... 250/269 |
| 5,019,708 A * | 5/1991 | Flaum ....................... 250/264 |
| 5,055,676 A * | 10/1991 | Roscoe et al. ........... 250/269.7 |
| 5,334,833 A * | 8/1994 | Case et al. .............. 250/269.1 |
| 5,513,528 A * | 5/1996 | Holenka et al. ......... 73/152.03 |
| 5,528,030 A * | 6/1996 | Mickael .................. 250/269.4 |
| 5,596,191 A * | 1/1997 | Mickael .................. 250/269.4 |
| 5,789,752 A * | 8/1998 | Mickael .................. 250/269.5 |
| 5,808,298 A * | 9/1998 | Mickael .................. 250/269.6 |
| 6,124,590 A * | 9/2000 | Mickael .................... 250/264 |
| 6,272,434 B1 * | 8/2001 | Wisler et al. ................ 702/9 |
| 6,470,274 B1 * | 10/2002 | Mollison et al. .............. 702/7 |
| 6,484,102 B1 * | 11/2002 | Holmes ....................... 702/6 |
| 6,648,082 B2 * | 11/2003 | Schultz et al. .............. 175/39 |
| 2002/0008197 A1 * | 1/2002 | Mickael .................. 250/269.2 |
| 2003/0178560 A1 | 9/2003 | Odom et al. |
| 2004/0222368 A1 | 11/2004 | Odom et al. |
| 2005/0114029 A1 * | 5/2005 | Clavaud et al. .............. 702/7 |

* cited by examiner

*Primary Examiner*—Constantine Hannaher
*Assistant Examiner*—Djura Malevic
(74) *Attorney, Agent, or Firm*—Madan, Mossman & Sriram, P.C.

(57) ABSTRACT

Measurements made with porosity and density logging tools in a gas reservoir may differ due to invasion effects. The effects are particularly large on measurement-while-drilling applications where invasion is minimal. Using a Monte-Carlo method, a relationship is established between true formation porosity and porosity estimates from density and porosity tools. This relationship is used on real data to get an improved estimate of formation porosity and of gas saturation.

31 Claims, 6 Drawing Sheets

METHOD FOR DETERMINING FORMATION POROSITY AND GAS SATURATION IN A GAS RESERVOIR

BACKGROUND OF THE INVENTION

1. Field of the Invention

This invention relates generally to borehole logging apparatus and methods for performing nuclear radiation based measurements. More particularly, this invention relates to a new and improved apparatus for determination of formation porosity and gas saturation using a measurement-while-drilling (MWD) tool that measures formation density and formation porosity shortly after a well has been drilled.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

Porosity measurements are commonly done by using a dual detector neutron logging tool using a source of neutrons irradiating the formation being studied. In wireline applications, the tool typically is forced against one side of the borehole wall by eccentralizing springs. Other devices, such as laterally extending arms may be used. The eccentralizing device may be hydraulically, mechanically, electrically or electromechanically powered. The resulting neutron population is sampled by a pair of neutron detectors spaced at different distances from the neutron source. Using a dual detector tool, the ratios of measurements made by the near detector and the far detector are used to get a compensated porosity measurement. Alternatively, the so-called spine and rib method may also be used. The method works reasonably well in wireline applications.

Density measurements are commonly done by using a dual detector gamma ray logging tool using a source of gamma rays irradiating the formation being studied. Just as for the porosity tool, in wireline applications, the tool typically is forced against one side of the borehole wall by laterally extending arms. The resulting gamma ray population is sampled by a pair of gamma ray detectors spaced at different distances from the gamma ray source. Using a dual detector tool, measurements made by the near detector and the far detector for a density logging tool are also corrected using the so-called spine and rib method to get a corrected porosity measurement.

Neutron and density logging tools have different responses to the presence of gas in the formation because of differences in the physics of the measurements. A neutron tool response is sensitive mainly to the number of hydrogen atoms in the formation. During calibration of a neutron porosity tool, water-filled formations are used to develop porosity algorithms. A decrease in the number of hydrogen atoms is equivalent to a lower porosity. If a neutron porosity tool is then used in a gas-filled formation (which has a lower number of hydrogen atoms than a water-filled formation of the same porosity), the porosity estimate will be lower than the true porosity.

Gamma ray tools, on the other hand, are responsive to the total number of electrons in the formation. When a gamma ray tool is used in a gas formation, the estimated porosity will be higher than the true porosity. Hence in the case of a reservoir where there is gas instead of water or oil in the pore space, the porosity estimates made from the neutron logging tool and the gamma ray logging tool are different. Under these conditions, the true formation porosity lies between the measured neutron and density values. Log interpreters often find it difficult to accurately estimate the true formation porosity from these two curves.

The process is further complicated by the effects of borehole fluid invasion. The effect of invasion is to force the gas from the formation and replace it with borehole fluid. The neutron tool begins to sense the presence of more hydrogen atoms and yields a porosity estimate that is higher than before when only the gas was present; the opposite occurs for the density tool. The increase in the amount of water in the near formation, i.e., the increase in the number of electrons, is interpreted by the density tool algorithm as a higher density which translates into a lower porosity estimate. The end result is that the separation between the two curves begins to disappear as the invasion front increases in radial depth. The rate at which the two porosity logs approach the true porosity depends upon their radial sensitivities and their respective depths of investigations (DOI). In wireline measurements (made at some time after drilling has been completed), a reasonably correct estimate of porosity may be obtained by either tool. However, in measurement-while-drilling logging tools, invasion effects are minimal and the resulting porosity estimates would be in error.

U.S. Pat. No. 4,810,459 to Fontenot teaches s method and apparatus for determining true formation porosity utilize downhole measurement-while-drilling neutron porosity measurement devices. An initial measurement is taken shortly after the formation is bored and before any substantial invasion by the drilling fluid occurs. Subsequent measurements are made until a steady, no longer increasing, measurement is reached indicating saturation of the formation by the drilling fluid to the depth of the measurements. The steady measurement is indicative of the true porosity of a gas containing formation while the difference between the initial and steady measurements is indicative of the gas saturation of a gas containing formation. A major problem with the method of Fontenot is that measurements must continue to be made until this equilibrium is established. This is contrary to one of the reasons MWD measurements are made, which is to get an estimate of formation characteristics as soon as possible. Waiting for equilibrium to be reached is expensive in terms of rig costs. The Fontenot method does not address problems caused by tool rotation and variable standoff on a rotating sensor assembly.

U.S. Pat. No. 5,684,299 to DasGupta teaches a method of determination of formation porosity of a partially invaded gas reservoir by averaging density and neutron tool porosities. During the method of this invention, density tool and neutron tool porosity measurements are taken of the formation. These porosity measurements are fitted to a predetermined porosity to determine the percentage of each porosity measurement that will be summed to estimate the formation porosity of the gas reservoir. The percentages of the density and neutron porosity measurements are dependent on a correction factor that is determined from the fitting process. The method of DasGupta requires a reference calibration porosity and furthermore does not provide an estimate of gas saturation of the reservoir. Commonly used acoustic methods for determination of gas saturation are generally of marginal value since even a small amount of gas (low saturation gas or LSG) in the formation significantly affects the velocity of propagation of compressional waves.

There is a need for an accurate method of determination of porosity and gas saturation in an earth formation using a MWD apparatus that is insensitive to invasion effects. The present invention satisfies this need.

SUMMARY OF THE INVENTION

The present invention is a method of analyzing a mixture of at least two fluids in an earth formation. A first estimate of porosity of the earth formation is obtained from measurements made with a porosity logging tool on a bottom hole assembly (BHA) conveyed in a borehole in said earth formation during continued rotation of the BHA. An estimate of density of the earth formation is obtained from measurements with a density logging tool on the BHA during continued rotation. Using a predetermined relationship, an improved estimate of the porosity of the earth formation is obtained using the first estimate of porosity and the estimate of density. Using the improved estimate of porosity, the relative concentration of the two fluids is determined. The two fluids may be gas, oil or water. The density and porosity logging tools each have suitable sources for gamma rays and neutrons respectively, and two spaced apart detectors. Spine and rib corrections are part of the determination.

The predetermined relation is obtained using a Monte Carlo simulation and may be a third order polynomial. The simulations are carried out and predetermined relationships are established separately for limestone, dolomite and sandstone. The Monte Carlo simulation covers a range of porosities and relative fluid saturations. The density and porosity determinations may be based on measurement a variable standoff of the porosity and density logging tool during continued rotation.

In another aspect, the present invention is a well logging apparatus for analysis of a mixture of fluids in an earth formation. A porosity logging tool and a density logging tool are conveyed on a bottom hole assembly (BHA) conveyed in a borehole in the earth formation, and make measurements during continued rotation of the BHA. A standoff sensor measures standoff during the continued rotation. A processor makes a first estimate of porosity from the measurements made by the porosity logging tool estimates formation density from measurements made by the density logging tool. A standoff correction is included. An improved estimate of porosity is determined from the first estimate of porosity and the density estimate using a predetermined relation. An orientation sensor may be used for providing measurements of the orientation of the BHA during rotation. The processor then determines a relative concentration of the two fluids in the mixture from the improved porosity estimate.

The density and porosity logging tool have suitable sources of gamma rays and neutrons respectively and each have two spaced apart sensors. Application of a spine and rib correction is part of the determination. The predetermined relation is obtained by a Monte Carlo simulation and may be a third order polynomial.

BRIEF DESCRIPTION OF THE FIGURES

For detailed understanding of the present invention, references should be made to the following detailed description of the preferred embodiment, taken in conjunction with the accompanying drawings, in which like elements have been given like numerals and wherein.

DETAILED DESCRIPTION OF THE INVENTION

Figure 1:
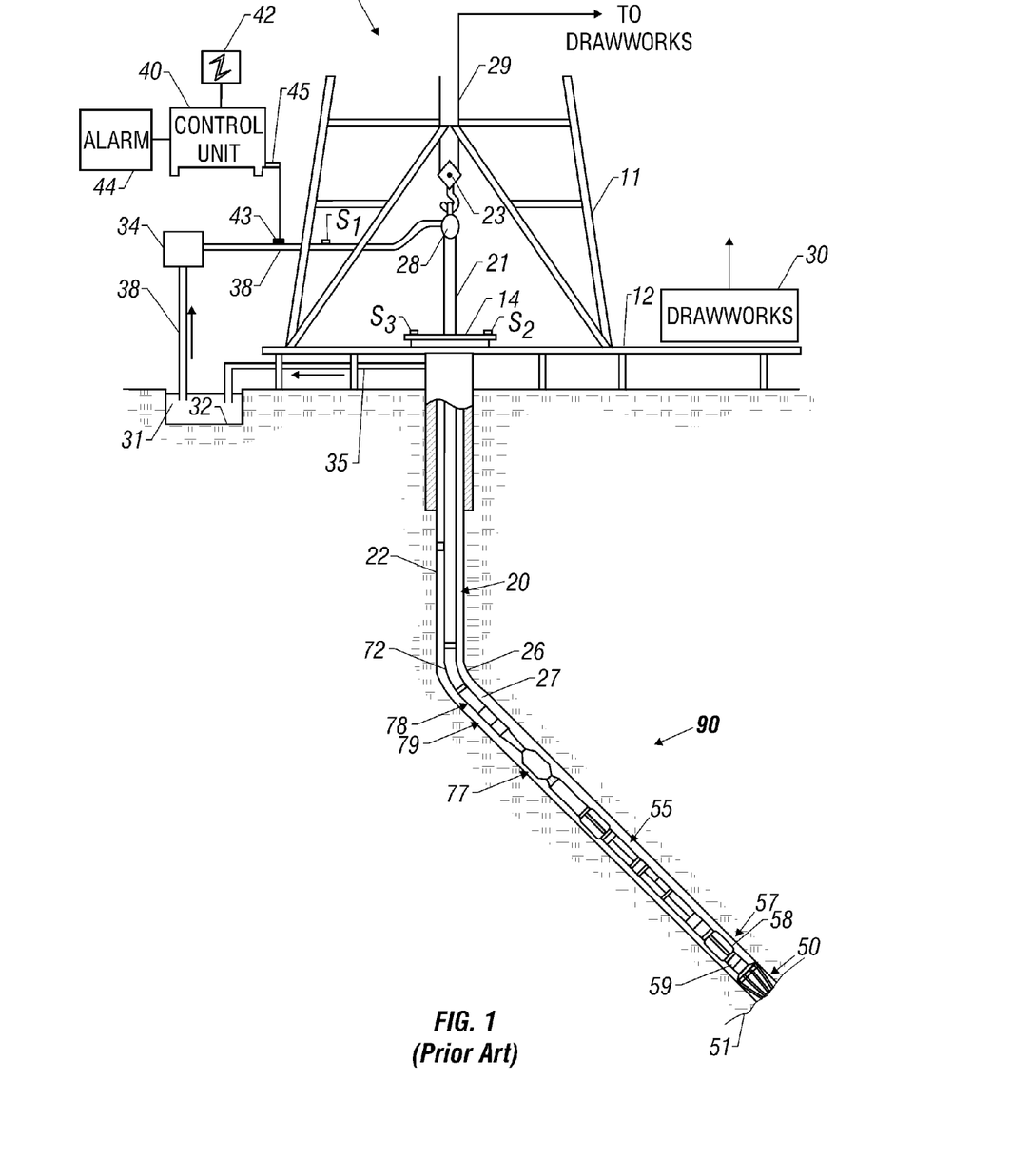
FIG. 1 (PRIOR ART) is a schematic illustration of an exemplary drilling system using the present invention.

FIG. 1 (PRIOR ART) shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communications sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
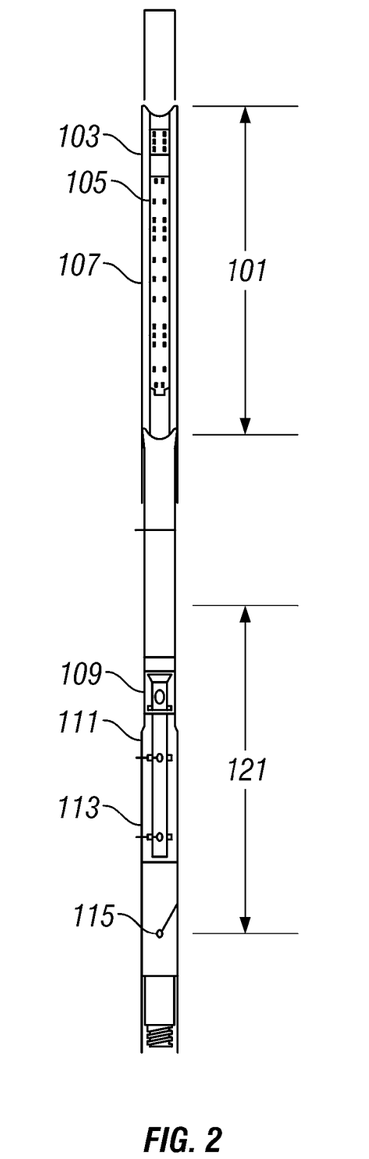
FIG. 2 shows the configuration of density and porosity logging tools suitable for use with the method of the present invention.

Turning now to FIG. 2, components of a bottom hole assembly (BHA) for providing Baker Hughes INTEQ's APLS$^{SM}$ (Advantage Porosity Logging Service$^{SM}$) LWD nuclear service are shown. The service provides a fully compensated and environmentally corrected neutron porosity and bulk density measurements. The tool combines a caliper corrected neutron (CCN) porosity sub designated by 101 and an optimized rotational density (ORD) sub designated by 121. The neutron porosity sub comprises a source of neutrons 103, a short-spaced (SS) detector 105 and a long-spaced (LS) detector 107. Similarly, the density sub comprises a source 109 with SS and LS detectors designated by 111 and 113. The operation of the LS and SS detectors for density and porosity logging tools would be known to those versed in the art. A suitable caliper designated by 115 is provided. This may be an acoustic caliper or a mechanical caliper. The use of acoustic calipers is discussed, for example, in U.S. Pat. No. 4,867,264 to Siegfried incorporated herein by reference.

In one embodiment of the present invention, stand-off corrected density and porosity measurements are determined using, for example, the method disclosed in U.S. Pat. No. 5,397,893 to Minette having the same assignee as the present invention and the contents of which are fully incorporated herein by reference. In Minette, the standoff in front of the detectors at any given time is measured. This information is then used to separate the density data into a number of bins based on the amount of standoff. The short space and long space densities are calculated from the data in each bin using the spine and rib correction. Then, these density measurements are combined in a manner that minimizes the total error in the density calculation. Minette uses the spine and rib method for correction; however, the binning method is equally applicable with the use of ratios of LS and SS measurements.

In an alternate embodiment of the invention, stand-off corrected and azimuthally segmented density and porosity measurements are determined using the method disclosed in U.S. Pat. No. 6,584,837 to Kurkoski having the same assignee as the present invention and the contents of which are fully incorporated herein by reference. In Kurkoski measurements made by the detectors are partitioned into spatial bins defined by standoff and azimuth. Within each azimuthal sector, the density measurements are compensated for standoff to provide a single density measurement for the sector. The azimuthal sectors are combined in such a way as to provide a compensated azimuthal geosteering density. The method of the invention may also be used with neutron porosity logging devices. It is necessary in using the Kurkoski method to have an orientation sensor such as a magnetometer on the tools. It should be noted that Kurkoski uses a spine and rib method for correction of standoff, however, the binning method used by Kurkoski is equally applicable when ratios of LS and SS measurements are used for standoff correction.

Figure 3:
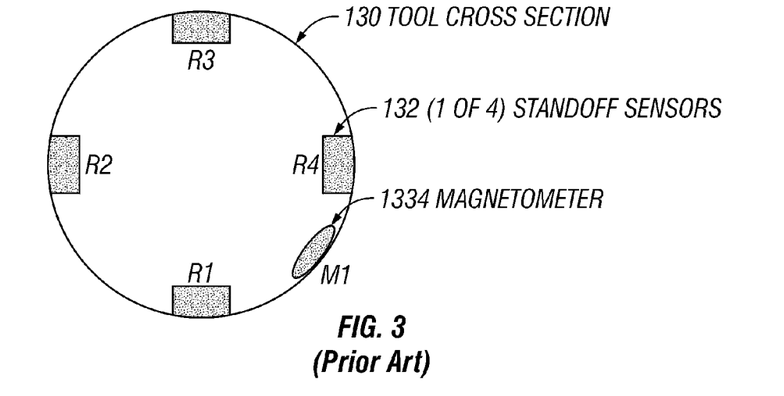
FIG. 3 shows an exemplary configuration of calipers and magnetometer on a downhole logging tool.

FIG. 3 illustrates cross section of a preferred acoustic caliper device. Four sensors R1, R2, R3 and R4 are shown circumferentially disposed around the drill collar with an azimuthal separation of 90°. Each sensor uses acoustic measurements to determine a travel time to the closest point on the borehole. For such a caliper, a commonly output measurement in well logging is the quantity $$S_1 = \frac{2 \cdot (x_1 + x_2 + x_3 + x_4)}{4} + T \tag{1}$$

$$S_{x\text{-}axis} = \frac{2 \cdot (x_1 + x_3)}{2} + T$$

$$S_{y\text{-}axis} = \frac{2 \cdot (x_2 + x_3)}{2} + T$$

where the $x_i$'s are standoff measurements made by the calipers R1, R2, R3 and R4 respectively, T is drill collar (tool) diameter, $S_1$ is a simple caliper, $S_{x\text{-}axis}$ is a simple caliper in the x axis, $S_{y\text{-}axis}$ is a simple caliper in the y axis.

In one embodiment of the present invention, the sensor arrangement includes a magnetometer 134 as shown in FIG. 3. Magnetometer M1 makes measurements of the direction of the earth's magnetic field. Except for the rare case wherein the borehole is being drilled along the direction of the earth's magnetic field, the magnetometer output in conjunction with borehole survey information can be used to determine the relative orientation of the sensor R1 to the vertical.

Figure 4:
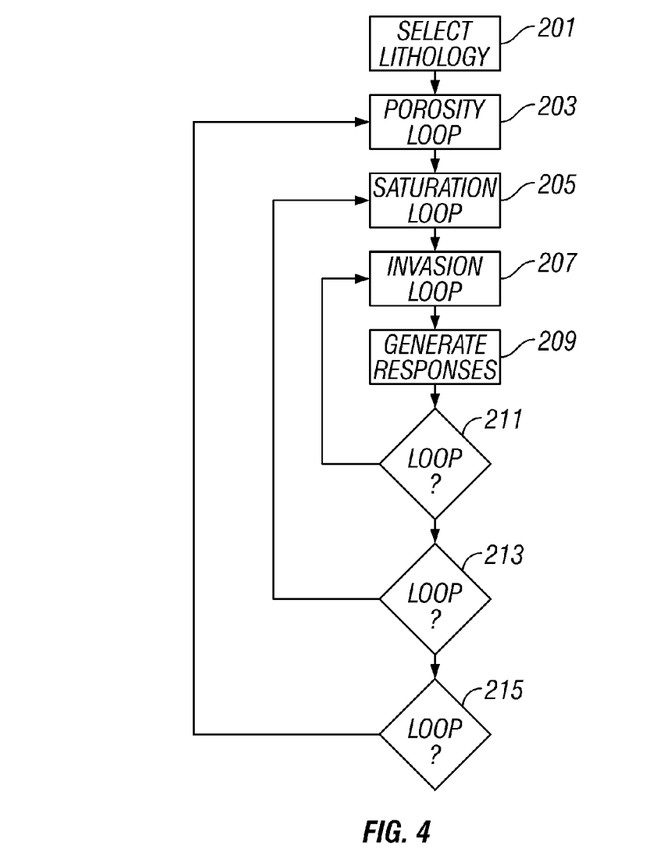
FIG. 4 is a flow chart illustrating an example of Monte Carlo simulation.
Figure 5:
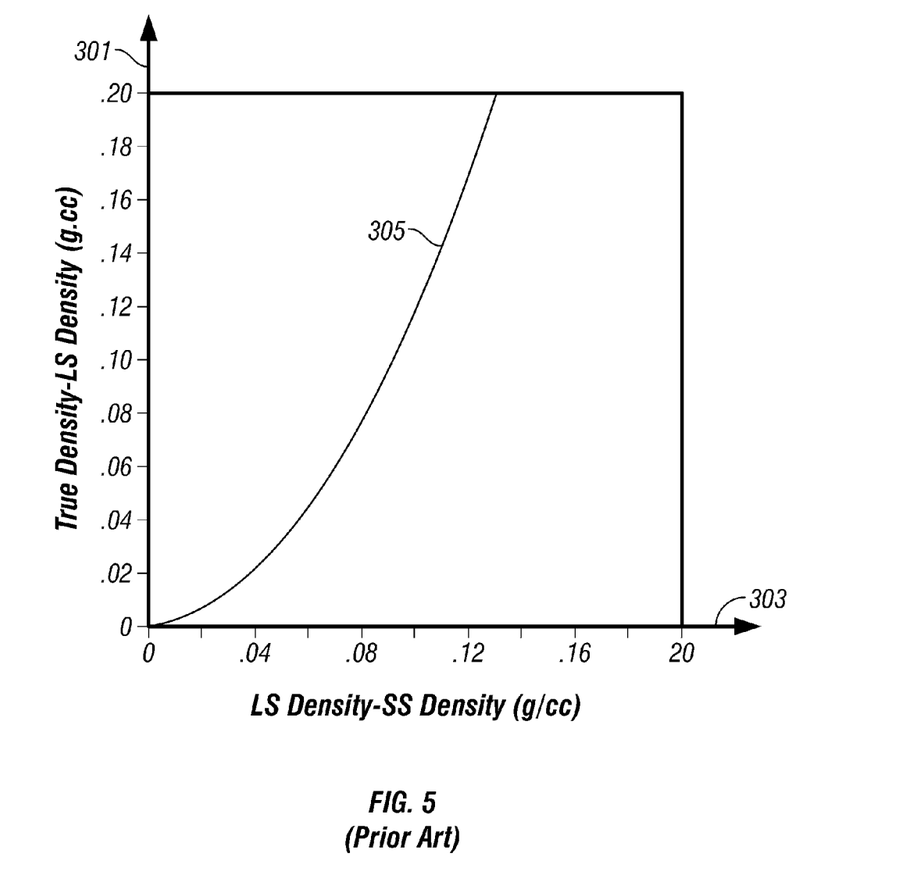
FIG. 5 schematically illustrates the spine and rib method.

Turning now to FIG. 4, a flow chart of part of the method of the present invention is shown. The results of the method are unique to a particular lithology. Hence what is shown in FIG. 4 is done separately for different lithologies, such as sandstone, limestone and dolomite. These three lithologies constitute most of the principal hydrocarbon reservoirs of the earth.

First, a lithology type is selected 201. As noted above, this could be sandstone, limestone, or dolomite. The invention is generally characterized by three different loops between 203 and 215, designated for convenience as a porosity loop (203 to 215), a saturation loop (205 to 213) and an invasion loop (207 to 211). These loops are discussed further below. It should be noted that the nesting of the loops is purely for illustrative purposes, and the nesting could be in any order. The purpose of the loops is to generate responses for a density logging tool and a porosity logging tool for a wide range of parameters. It should further be noted that what is important for the method of the present invention is this generation of responses for the density logging tool and the porosity logging tool: the use of nested loops is for illustrative purposes.

In the outer loop 203-215 a range of porosities is selected, and for a plurality of porosity values within this range, tool responses are simulated. In one embodiment of the invention, the range of porosities is taken to be from 0-100% with increments of 10%. In the loop 205-213, a range of values of water saturation is selected from 0-100% in steps of 10%. The steps are, again, a matter of convenience. Those versed in the art would recognize that for a two phase system (say water and gas in the formation), the oil saturation is simply 100% minus the water saturation. A two phase system could also be water and oil, though the effects of saturation on the tool responses would be less than for a water-gas system. The invention also envisages the use of a three phase system in which the formation comprises water, oil and gas.

The third loop is that of invasion. Specifically, in one embodiment of the invention, tool responses are generated for either no invasion or full invasion. By no invasion is meant that the two tools are responding to the virgin formation, whereas full invasion means that the measurements are being made by the two logging tools after borehole fluids have invaded the formation to the full depth of investigation of the individual tools. The neutron porosity tool typically has a greater depth of investigation than the gamma ray density tool.

For the values of the formation parameters defined above, a suite of tool responses is generated. These correspond to the SS and LS detectors for both the tools. From the generated tool responses, corrected density and porosity values are determined using prior art methods such as the spine and rib method. The "spine and ribs" algorithm and graphs such as that shown in FIG. 1. In the figure, the abscissa 301 is the difference between the LS and SS measurements while the ordinate 303 is the correction that is applied to the LS density to give a corrected density using the curve 305. As noted above, instead of the spine and rib technique, the standoff correction may be applied using the ratio of LS and SS measurements.

For the suite of generated responses, the actual values of the formation porosity are known. The corrected responses from the suite of generated responses are then analyzed to define a predictive relationship between the actual porosity and the corrected density and corrected porosity. In one embodiment of the invention, this predictive relationship is obtained by a multivariate regression taking coefficients up to the third order in the corrected density and corrected porosity. The results of the multivariate regression are given by the following relation:

$$\Phi_t = c_1 + c_2\Phi_a + c_3\rho_b + c_4\Phi_a^2 + c_5\rho_b^2 + \\ c_6\Phi_a\rho_b + c_7\Phi_a^3 + c_8\rho_b^3 + c_9\Phi_a\rho_b^2 + c_{10}\Phi_a^2\rho_b \quad (1)$$

where $\Phi_t$ is said true porosity, $\Phi_a$ is the corrected simulated porosity (for the neutron porosity tool), and $\rho_b$ is the corrected simulated density (for the gamma ray tool). The quantities $c_i$, i=1, 2 ... 9 are the regression coefficients. This regression relation is then applied to field measurements where $\Phi_a$ is the corrected porosity from the neutron porosity tool, and $\rho_b$ is the corrected density estimate from the gamma ray tool. As noted above, the corrected porosity estimates and the corrected density estimates for MWD tools can be obtained using either the method taught by Minette or the method taught by Kurkoski. As noted above, the method of Minette uses standoff binning whereas Kurkoski uses azimuthal binning in addition to standoff binning.

The regression coefficients obtained are given in Table I.

TABLE I

| | Regression of formation porosity | | |
|---|---|---|---|
| Coefficient | Limestone | Sandstone | Dolomite |
| $C_1$ | 1.05877E+02 | 1.07591E+02 | 1.0585E+02 |
| $C_2$ | 7.17819E−01 | 8.12127E−01 | 6.29098E−01 |
| $C_3$ | −4.17699E+01 | −5.07883E−01 | −3.80696E+01 |
| $C_4$ | −4.86896E−03 | −5.805793E−03 | −4.22286E−03 |
| $C_5$ | 1.13451E+00 | 7.28402E+00 | 3.50100E−01 |
| $C_6$ | −1.61869E−01 | −2.46287E−01 | −1.33937E−01 |
| $C_7$ | 1.65264E−05 | 1.79639E−05 | 1.46575E−05 |
| $C_8$ | −5.25012E−02 | −1.30456E+00 | 2.50497E−02 |
| $C_9$ | 1.42814E−02 | 2.93225E−02 | 1.07836E−02 |
| $C_{10}$ | 1.01021E−03 | 1.7490E−03 | 9.09252E−04 |

Once the formation porosity has been estimated, it is straightforward to determine the gas saturation for a gas-water mixture. For example, for a gas density of 0.1 g/cc, the results are:

$$S_g = S_g = \frac{2.71 - \rho_b}{0.009\Phi_t} - 1.9 \quad (2)$$

$$S_g = \frac{2.65 - \rho_b}{0.009\Phi_t} - 1.833$$

$$S_g = \frac{2.87 - \rho_b}{0.009\Phi_t} - 2.0778$$

while for a gas density of 0.06 g/cc, the results are:

$$S_g = \frac{2.71 - \rho_b}{0.009\Phi_t} - 1.8191 \quad (3)$$

$$S_g = \frac{2.65 - \rho_b}{0.009\Phi_t} - 1.7533$$

$$S_g = \frac{2.87 - \rho_b}{0.009\Phi_t} - 1.9894$$

Next, an example of application of the method of the present invention to field data is shown. Four method were compared.

Method 1: Quicklook Neutron-Density is a prior art method for porosity estimation and is fast and accurate for liquid hydrocarbon and connate water, and is applicable in this case for gas density below 0.25 g/cc. This general analytical method is a closed form solution combining admixtures of bulk density and neutron porosity to yield porosity independent of water saturation.

$$\Phi_t = 1 - \frac{\rho_b}{\rho_{ma}} + \frac{\Phi_N}{\rho_{ma}} = 1 - 0.38\rho_b + 0.38\Phi_N \quad (4)$$

for a sandstone, where $\rho_{ma}$ is the matrix density.

Method 2: Iterative Resistivity-Density is another standard prior art approach to accurately estimate porosity. The density porosity relation is $$\Phi_t = \frac{\rho_{ma} - \rho_b}{\rho_{ma} + \rho_f} \quad (5)$$

where $\rho_{fl}$ is the fluid density. When fluid density is not known, as is usually the case, resistivity is used to calculate water saturation from one of the many "Archie" relations. Then fluid density is estimated from $$\rho_{fl} = \rho_w S_w + \rho_g (1 - S_w) \quad (6)$$

Since porosity is needed to calculate water saturation the process is iterative. A good initial porosity input to begin the iteration would come from Method 1. The method assumes we know $\rho_w$ and $\rho_g$ which is often the case. Gas density is determined from the non-ideal gas equation of state, estimated to be 0.102 g/cc at reservoir condition; the connate water density is 1.0 g/cc. We determined fluid density in the reservoir to vary from 0.15 to 0.20 g/cc. A difficulty with method 2 is that we assume the saturation estimated from resistivity is the same saturation "seen" by the density sensor. This is true in the absence of invasion or if the resistivity device is very shallow. Neither assumption is generally valid for LWD; however in our case study invasion was negligible. The shallowest 2 MHz phase difference resistivity is used since it investigates the volume relatively close to the density volume, and has the broadest range, best accuracy and vertical resolution of the LWD propagation resistivity recordings.

Method 3: Iterative Neutron-Density is another prior art method that is resistivity independent. We know that bulk density and neutron porosity recordings are dependent upon the saturation, density and hydrogen index of the pore fluids, as well as porosity and shale. In the LWD environment the logs often exhibit wide separation, and thus are truly independent measurements. Our density-neutron based approach simultaneously solves for fluid density and the effective porosity. Density and neutron porosity can be expressed as functions of the components of the formation:

$$\rho_b = (1 - V_{sh} - \Phi_e)\rho_{ma} + V_{sh}\rho_{sh} + \Phi_e \rho_{fl}$$

$$\Phi_N = (1 - V_{sh} - \Phi_e)\Phi_{Nma} + V_{sh}\Phi_{Nsh} + \Phi_e \Phi_{Nfl} - Exc \quad (7)$$

using a matrix neutron porosity $\Phi_{Nma} = 0$. Exc, the excavation effect (Segesman and Lui, 1971) is neglected in the first instance. The method assumes that both neutron and density are measuring the same saturation; then one can write:

$$\rho_{fl} = S_w \rho_w + (1 - S_w)\rho_g$$

$$\Phi_{Nfl} = S_w \Phi_{Nw} + (1 - S_w)\Phi_{Ng} \quad (8)$$

which leads to $$\Phi_{Nfl} = \frac{\rho_{fl} - \rho_g}{\rho_w - \rho_g}\Phi_{NW} + \frac{\rho_w - \rho_{fl}}{\rho_w - \rho_g}\Phi_{Ng} \quad (9)$$

and allows substitution of $\Phi_{Nfl}$ by a function of $\rho_{fl}$ in the neutron equation. The neutron-density system is then solved to yield $\Phi_e$ and $\Phi_{fl}\rho_e$. The value of $\Phi_{fl}$ is limited to be between $\rho_g$ and $\rho_w$; and $\Phi_e$ is recalculated with this limited $\rho_{fl}$. After the first step the process is repeated taking into account the excavation effect determined from the previous iteration:

$$Exc = \left(\frac{\rho_{ma}}{2.65}\right)^2 (2\Phi_e^2 \Phi_{Nfl} + 0.04\Phi_e)(1 - \Phi_{Nfl}) \quad (10)$$

The process is iterated until the porosity solution becomes stable. Reconstruction to the total porosity system allows comparison with the other methods:

$$\Phi_t = \Phi_e + V_{sh}\Phi_{sh} \quad (11)$$

where $\Phi_{sh}$, the water filled shale porosity, is taken from an adjacent shale bed. For the particular example on which the various methods were tested, this shale value from an adjacent bed is supported by the core data. Shale volume is determined from the gamma ray log. Whilst we use the excavation concept for simplicity and convenience, a more realistic physical understanding is gained from an appreciation of the neutron slowing down length (Ellis et al, 2003 and 2004).

Figure 6A:
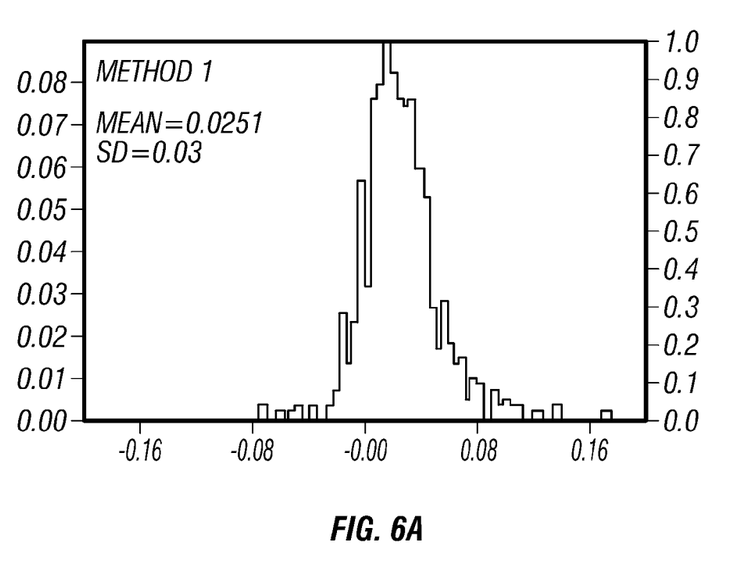
FIGS. 6a-6d shows comparisons of porosity estimates obtained using three prior art methods and the method of the present invention with core data.
Figure 6B:
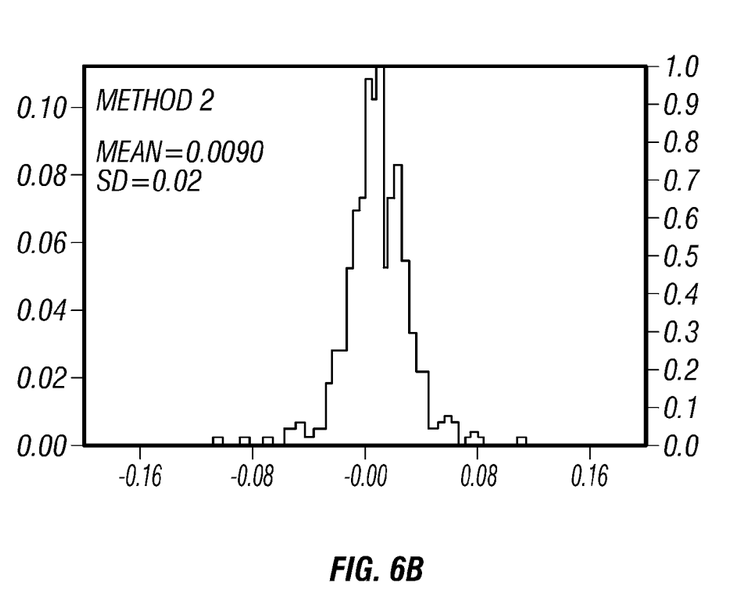
Figure 6C:
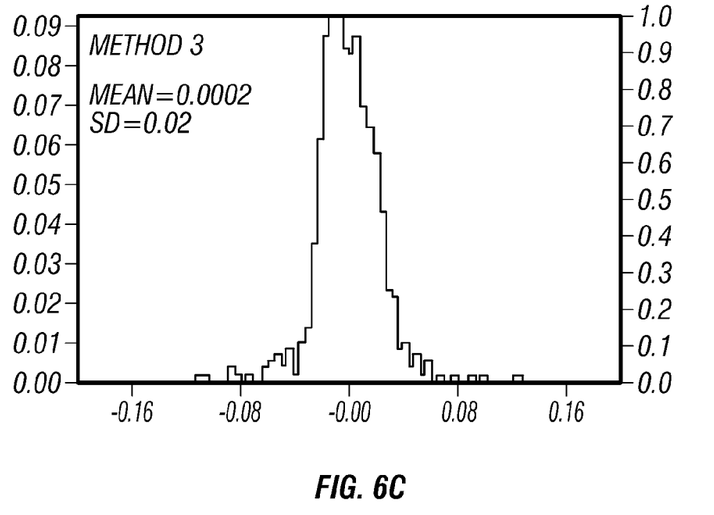
Figure 6D:
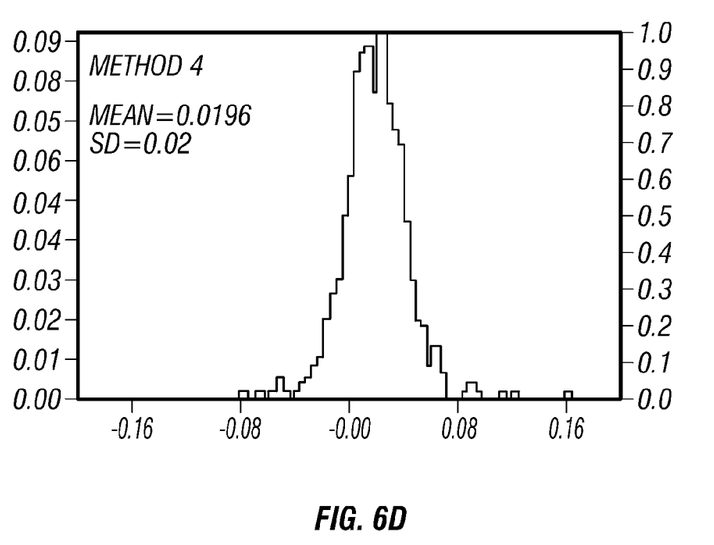

Turning now to FIG. 6a,-6d show results from the three prior art methods and the method of the present invention are shown. Porosity difference of each of the methods to the core data is shown. Methods 1-3 are shown in FIGS. 6a-6c while the results of the present method are shown in FIG. 6d.

All results show good vertical response and considering the uncertainties in the analysis methods, log and core data, good to excellent agreement with core porosity is achieved. The method of the present invention is a lot simpler to implement than the prior art methods. Method 1 is simply a first order polynomial and based on log data (not shown), has inaccuracies in shaly intervals. In contrast, the method of the present invention can address the shaliness by including it as part of the Monte Carlo simulation. Methods 2 and 3 require additional assumptions and/or measurements made by other formation evaluation sensors.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of analyzing a mixture of at least two fluids in an earth formation, the method comprising:
   (a) obtaining a first estimate of a porosity of said earth formation from measurements made with a porosity logging tool conveyed in a borehole in said earth formation, the porosity logging tool having a standoff from a wall of the borehole;
   (b) obtaining an estimate of density of said earth formation from measurements with a density logging tool;
   (c) determining a second estimate of said porosity of said earth formation from said first estimate of porosity and said estimate of density,
   (d) determining a relative concentration of the at least two fluids using the second estimate of porosity, wherein at least one of the fluids comprises a gas, the estimation being done without use of a resistivity measurement; and
   (e) recording the determined relative concentration on a suitable medium.

2. The method of claim 1 wherein said porosity logging tool comprises a source of neutrons, a first detector (SS) spaced apart from said source, and a second detector (LS) spaced apart from said source at a greater distance than said first detector.

3. The method of claim 2 wherein obtaining said first estimate of said porosity comprises determining a ratio of measurements made by said LS and SS detectors of said porosity logging tool.

4. The method of claim 1 wherein said porosity logging tool comprises a source of neutrons, a first detector (SS) spaced apart from said source, and a second detector (LS) spaced apart from said source at a greater distance than said first detector.

5. The method of claim 4 wherein obtaining said estimate of said density comprises using a spine and rib method.

6. The method of claim 1 wherein said earth formation comprises at least one of (i) a limestone, (ii) a dolomite, and, (iii) a sandstone.

7. The method of claim 1 wherein said at least two fluids are selected from the group consisting of (i) gas, (ii) water, and, (iii) oil.

8. The method of claim 1 further comprising conveying the porosity logging on a bottom hole assembly (BHA) and making measurements with the porosity logging tool during continued rotation of the BHA.

9. The method of claim 8 wherein obtaining said first estimate of said porosity further comprises using a measurement of a variable standoff of said porosity logging tool during said continued rotation.

10. The method of claim 8 wherein obtaining said estimate of said density further comprises using a measurement of a variable standoff of said density logging tool during said continued rotation.

11. The method of claim 1 wherein determining the second estimate of the porosity further comprises using a predetermined relation.

12. The method of claim 11 further comprising obtaining said predetermined relation by a Monte Carlo simulation.

13. The method of claim 12 wherein said Monte Carla simulation covers one or more of (i) a range of porosities, (ii) a range of relative fluid saturations, (iii) a range of invasion values, and, (iv) a range of shale content of the earth formation.

14. The method of claim 11 wherein said predetermined relation comprises a third order polynomial.

15. The method of claim 11 wherein said predetermined relation is of the form $$\Phi_t = c_1 + c_2\Phi_a + c_3\rho_b + c_4\Phi_a^2 + c_5\rho_b^2 + c_6\Phi_a\rho_b + c_7\Phi_a^3 + c_8\rho_b^3 + c_9\Phi_a\rho_b^2 + c_{10}\Phi_a^2\rho_b$$

where $\Phi_t$ is said second porosity estimate, $\Phi_a$ is said first porosity estimate, $\rho_b$ is said density estimate, and ($c_i$, i= 1,2 . . . 9) are constants.

16. A well logging apparatus for analysis of a mixture of fluids in an earth formation, the apparatus comprising:
   (a) a porosity logging tool configured to be conveyed in a borehole in said earth formation;
   (b) a density logging tool; and
   (c) and a processor configured to:
      (i) determine from said measurements made by said porosity logging tool a first estimate of porosity of said earth formation;
      (ii) determine from measurements made by said density logging tool an estimate of a density of said earth formation,
      (iii) determine a second estimate of said porosity of said earth formation from said first estimate of porosity and said estimate of density;
      (iv) use the second estimate of porosity to determine a saturation of a gas in the earth formation, the estimation being done without use of a resistivity measurement; and
      (v) record the determined relative concentration on a suitable medium.

17. The apparatus of claim 16 wherein said density logging tool comprises a source of gamma rays, a first detector (SS) spaced apart from said source, and a second detector (LS) spaced apart from said source at a greater distance than said first detector.

18. The apparatus of claim 17 wherein said processor is further configured to obtain said estimate of said density by using a spine and rib method.

19. The apparatus of claim 16 wherein said porosity logging tool comprises a source of neutrons, a first detector (SS) spaced apart from said source, and a second detector (LS) spaced apart from said source at a greater distance than said first detector.

20. The apparatus of claim 19 wherein said processor is further configure to obtain said first estimate of said porosity determining a ratio of measurements made by said LS and SS detectors of said porosity logging tool.

21. The apparatus of claim 16 wherein said earth formation comprises at least one of (i) a limestone, (ii) a dolomite, and, (iii) a sandstone.

22. The apparatus of claim 16 wherein said standoff sensor comprises an acoustic sensor.

23. The apparatus of claim 16 wherein said processor is further configured to obtain said estimate of said density by using a measurement of said standoff sensor.

24. The apparatus of claim 16 wherein said at least two fluids are selected from the group consisting of (i) gas, (ii) water, and, (iii) oil.

25. The apparatus of claim 16 wherein the porosity logging tool is conveyed into the borehole on a bottomhole assembly (BHA) and makes measurements during continued rotation thereof.

26. The apparatus of claim 25 further comprising an orientation sensor.

27. The apparatus of claim 16 wherein the processor determines the second estimate of the density using a predetermined relation.

28. The apparatus of claim 27 wherein said predetermined relation is obtained by a Monte Carlo simulation.

29. The apparatus of claim 28 wherein said Monte Carlo simulation covers a range of porosities and a range of relative fluid saturations of said mixture of fluids.

30. The apparatus of claim 27 wherein said predetermined relation comprises a second order polynomial.

31. The apparatus of claim 27 wherein said predetermined relation is of the form $$\Phi_t = c_1 + c_2\Phi_a + c_3\rho_b + c_4\Phi_a^2 + \\ c_5\rho_b^2 + c_6\Phi_a\rho_b + c_7\Phi_a^3 + c_8\rho_b^3 + c_9\Phi_a\rho_b^2 + c_{10}\Phi_a^2\rho_b$$

where $\Phi_t$ is said second porosity estimate, $\Phi_a$ is said first porosity estimate, $\rho_b$ is said density estimate, and ($c_i$, i= 1,2 . . . 9) are constants.

* * * * *